United States Patent [19]
Kato et al.

[11] 3,956,420
[45] May 11, 1976

[54] POLYOLEFIN COMPOSITION FOR ELECTRICAL INSULATION

[75] Inventors: Hirosi Kato; Nobuyuki Maekawa, both of Amagasaki, Japan

[73] Assignee: Dainichi-Nippon Cables, Ltd., Hyogo, Japan

[22] Filed: Sept. 3, 1974

[21] Appl. No.: 502,380

[30] Foreign Application Priority Data
Sept. 3, 1973 Japan.............................. 48-99481
Sept. 3, 1973 Japan.............................. 48-99486

[52] U.S. Cl...................... 260/827; 260/45.8 NW; 260/45.75 P; 260/824 R
[51] Int. Cl.².............................................. C08J 3/20
[58] Field of Search............ 260/45.8 NW, 45.75 P, 260/827, 824 R

[56] References Cited
UNITED STATES PATENTS

| | | | |
|---|---|---|---|
| 2,894,921 | 7/1959 | Jones | 260/45.8 |
| 3,060,149 | 10/1962 | Coxan | 260/45.8 |
| 3,262,906 | 7/1966 | Perry | 260/45.8 |
| 3,296,189 | 1/1967 | Eastman | 260/45.8 |
| 3,337,493 | 8/1967 | New et al. | 260/45.8 |
| 3,577,346 | 5/1971 | McKeown | 260/45.75 |
| 3,629,110 | 12/1971 | Hunt | 260/45.8 |
| 3,742,084 | 6/1973 | Olyphant et al. | 260/824 |

*Primary Examiner*—V. P. Hoke
*Attorney, Agent, or Firm*—Armstrong, Nikaido & Wegner

[57] ABSTRACT

A polyolefin composition comprising polyolefin, a small amount of a ferrocene compound, and an 8-substituted quioline compound has excellent electrical breakdown strength, and therefore is suitable for electrical insulation.

A polyolefin composition which is constructed by adding a small amount of a siloxane oligomer to the above polyolefin composition shows more improved electrical breakdown strength and also exhibits superior voltage endurance over a long period of immersion in water.

11 Claims, No Drawings

POLYOLEFIN COMPOSITION FOR ELECTRICAL INSULATION

BACKGROUND OF THE INVENTION

The present invention relates to polyolefin compositions for electrical insulation having high electrical breakdown strength.

Conventionally various attempts have been made to improve the electrical breakdown strength of polyolefin by adding additives to polyolefin. Some of these attempts have matured to improvements as specifically disclosed in U.S. Pat. Nos. 3,542,648 and 3,126,358, British Patent No. 1,202,910 and Japanese Patent Publication No. 19663/1970, etc.

However, the polyolefin compositions proposed have the drawback that when subjected to exposure at elevated temperatures or subjected to heat cycle, the compositions loss their initial breakdown strength. Moreover the polyolefin compositions disclosed in prior arts may be not suitable as insulating materials for use at an extra-high voltage, such as 275 kV.

Our researches have revealed that a polyolefin composition prepared by adding a small amount of ferrocene compound and an 8-substituted quinoline compound to polyolefin exhibits improved electrical breakdown strength, and is capable of retaining excellent voltage endurance even when subjected to heating or heat cycle. Further, incorporating of a siloxane oligomer together with above additives, the resultant composition shows more improved electrical breakdown strength and also exhibits superior voltage endurance over a long period of emmersion in water.

OBJECTS OF THE INVENTION

An object of this invention is to provide an electrical insulating composition having excellent electrical breakdown strength.

Another object of this invention is to provide an electrical insulating polyolefin composition which retains its original outstanding electrical breakdown strength for a prolonged period of time even after heated during operation with alternating current or subjected to heat treatment in a vacuum.

Another object of this envention is to provide an electrical insulating polyolefin composition having excellent electrical breakdown strength even while being continuously subjected to an elevated temperature of around 110°C.

Another object of this invention is to provide an electrical insulating polyolefin composition maintaining satisfactory voltage endurance over a long period of immersion in water.

Still another object of this invention is to provide crosslinked polyolefin compositions having excellent electric breakdown strength and higher durability under water immersion which are suitable for use of electrical insulating materials.

SUMMARY OF THE INVENTION

The composition of the present invention comprises polyolefin, small amounts of ferrocene compound, and 8-substituted quinoline compound, or comprises polyolefin, small amounts of ferrocene compound, 8-substituted quinoline compound, and siloxane oligomer.

DETAILED DESCRIPTION OF THE INVENTION

The polyolefins to be used in this invention are homopolymers, copolymers or mixtures of at least two of these polymers and copolymers of olefins represented by the formula:

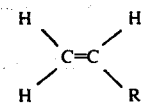

wherein R is hydrogen atom, alkyl group of less than three carbon atoms, —COOR' or —OCOR' group where R' is alkyl or aryl group of less than six carbon atoms. Examples of such polyolefins are polyethylene, polypropylene, ethylene-propylene copolymer, ethylene-propylene-diene terpolymer, ethylene-vinyl acetate copolymer, ethylene-ethyl acrylate copolymer, polymethylmethacrylate, polystyrene, etc., among which polyethylene is most preferable.

The ferrocene compound in this invention involves ferrocene, substituted ferrocene, and polymerized ferrocene. The ferrocene compounds are represented by the following formulae I to VIII:

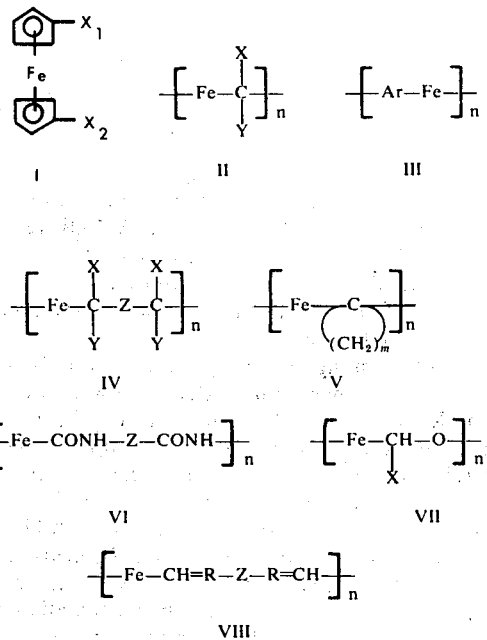

In formula I, $X_1$ and $X_2$ are each hydrogen or halogen atom, or alkyl, aryl, acyl, amino, carboxy, carboalkoxy or silyl group, respectively.

In formulae II to VIII, Fc is ferrocene ($\pi$-$C_5H_5$-Fe-$C_5H_5$) skeleton, —Fe— is a 1,2-, 1,3-, or 1,1'-disubstituted ferrocenylene unit and n is an integer of 2 to 10,000.

In formula II, X and Y are halogen or hydrogen atom, or alkyl, alkenyl, aryl, aralkyl, aralkenyl, hydroxy or alkoxy group, respectively.

In formula III, Ar is o-, m- or p-phenylene or other arylene group, such as naphthylene or anthracenylene, with or without a substituent thereon.

In formula IV, X and Y are each the same as X and Y of formula II, or X and Y may form a carbonyl group together with the carbon atom connected with X and Y and Z is alkylene, arylene, aralkylene, alkenylene or aralkenylene group.

In formula V, m is an integer of 2 to 12 and the carbon ring composed of C and $-(CH_2)_m-$ may contain an unsaturated bond and have a substituent thereon.

In formulae VI and VIII, Z is the same as Z in formula IV, R in formula VIII being nitrogen atom or methine group.

In formula VII, X is the same as X in formula II.

Compounds of formula IV wherein at least either of X or Y is a hydroxyl group of alkoxyl group, and Z is an arylene group, Compounds of formula V wherein m is an integer of 4 to 7, and Compounds of formula VII wherein X is an alkyl group.

Table 1 shows especially desirable examples among the ferrocene compounds (indicated as "ferrocene polymers") represented by formulae II to VIII.

Table 1

| Ferrocene polymer | Formula | X | Y | Ar or Z | m |
|---|---|---|---|---|---|
| 1 | II | H | $C_6H_5$ | — | — |
| 2 | II | H | p-$CH_3$—$C_6H_4$— | — | — |
| 3 | II | H | p-$CH_3O$—$C_6H_4$— | — | — |
| 4 | II | H | $CH_3CH=CH-$ | — | — |
| 5 | II | H | $C_6H_5CH=CH-$ | — | — |
| 6 | II | H | $CH_3+CH_2+_7$ | — | — |
| 7 | II | H | o-OH—$C_6H_4$ | — | — |
| 8 | II | H | p-$(CH_3)_2N$—$C_6H_4$— | — | — |
| 9 | II | $CH_3$ | $C_6H_5$ | — | — |
| 10 | II | $C_6H_5$ | $C_6H_5$ | — | — |
| 11 | III | — | — | 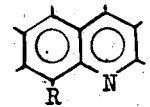 | — |
| 12 | III | — | — | Br-substituted arylene | — |
| 13 | IV | H | OH | $C_6H_4$ | — |
| 14 | IV | (X—C—Y : >C=O) | | $C_6H_4$ | — |
| 15 | V | — | — | — | 5 |
| 16 | VII | $CH_3$ | — | — | — |

Those organic groups, $X_1$, $X_2$ in formula I, X, Y in formulae II and IV, and X in formula VII have carbon atoms less than 30, preferably less than 25.

Those organic groups, Ar in formula III and Z in formulae IV, VI and VIII, have carbon atoms less than 40, preferably less than 30.

Preferable among the ferrocene compounds represented by the above formula I are those in which $X_1$ and/or $X_2$ are each hydrogen atom, alkyl, aryl, acyl, amino, carboxyl, carboalkoxy or silyl group. Especially preferable among these are ferrocene, acetyl ferrocene, t-amylferrocene, n-butylferrocene, 1,1'-di-n-butylferrocene, 1,1'-dimethylferrocene, N,N-dimethylaminoferrocene, carboethoxy-acetylferrocene, ferrocene carboxylic acid, ferrocene acetic acid, ethylferrocene, cinnamoylferrocene, triphenylmethylferrocene, phenylferrocene, 1,1'-diphenylferrocene, 1,2-diphenylferrocene, 1,3-diphenylferrocene, ferrocene aldehyde, methyl ferrocenyl carbinol, N,N-dimethylaminomethylferrocene, 2-N,N-dimethylaminoethylferrocene, hydroxymethylferrocene, cyanomethylferrocene, vinyl ferrocene, chloromethyl-ferrocene and trimethylsilylferrocene.

Preferable examples of the ferrocene compounds represented by formulae II to VIII are as follows:

Compounds of formula II wherein X is a hydrogen atom and Y is an alkyl, aryl, alkenyl, aralkyl or aralkenyl group, Compounds of formula II wherein X is an alkyl or aryl group, and Y is alkyl, aryl, alkenyl, aralkyl, aralkenyl, or alkoxy group or halogen atom, Compounds of formula III wherein Ar is an alkoxy—hydroxy—, or halogen-substituted arylene group, The ferrocene compounds of formulae I to VIII are prepared by the method disclosed, for instance, in J. Organometallic Chem., 58, 323 to 410 (1973), and United States Patent No. 3,819,583.

The 8-substituted quinoline compounds to be used according to this invention are quinoline compounds having a specified substituent R at the 8-position and represented by the formula IX:

IX wherein R is a halogen atom, alkyl, aryl, hydroxyl, amino, nitro, carboxyl, alkoxyl, aryloxyl, alkenyl, acyl, imino, mercapto or amide group. Each of above organic groups has carbon atoms of less than 30. The quinoline skelton may have 1 to 3 substituents, such as alkyl, amino, alkoxyl, and carboxyl group, at positions other than the 8-position. Preferable among these 8-substituted quinoline compounds are those in which R of formula IX is alkyl, aryl, amino, alkenyl, acyl, amide or hydroxyl group, such as 8-ethylquinoline, 8-methylquinoline, 8-chloromethylquinoline, 8-propylquinoline, 8-phenylquinoline, 2,8-dimethylquinoline, 4,8-dimethylquinoline, 5,8-dimethylquinoline, 6,8-dimethylquinoline, 2,3,8-trimethylquinoline, 2,4,8-trimethylquinoline, 2,6,8-trimethylquinoline, 4,5,8-trimethylquinoline, 2-ethyl-3,8-dimethylquinoline, 2,4,5,8- tetramethylquinoline, 2,5,6,8-tetramethylquinoline, 2,4,6,8-tetramethylquinoline, 2-ethyl-3,6,8-trimethylquinoline, quinoline-8-methanol, 2-chloro-8-methylquinoline, quinoline-8-carboylanilide, methyl 5-(8-hydroxyquinolyl) ketone, methyl 5-(8-hydroxyquinolyl) ketone oxime, phenyl 5-(8-hydroxyquinolyl) ketone, phenyl 5-(8-hydroxyquinolyl) ketone oxime, 8-hydroxyquinoline-5-acetamide, 8-hydroxyquinoline-5-benzamide, 8-hydroxyquinoline-5-carboylanilide, 8-hydroxyquinoline-5-carboxylic acid ethanol amide, 8-hydroxyquinoline-5-carboxylic acid methyl amide, methyl 8-quinolyl ketone, 2-(3,8-dimethylquinolyl) methyl ketone, 5-(8-methoxyquinoyl) methyl ketone, 8-aminoquinoline, 8-hydroxyquinoline, 8-hydroxyquinoline-7-aldehyde, 5-hydroxymethyl-8-hydroxyquinoline, 7-aminomethyl-8-hydroxyquinoline, 7-(2-propenyl)-8-hydroxyquinoline, 8-benzoyloxyquinoline, quinoline-8-carboxylic acid, 8-methylcarbostyril, 8-methyl-5-hydroxyquinoline, 2-phenyl-8-hydroxyquinoline, 2-methyl-8-hydroxyquinoline, 8-methyl-6-hydroxyquinoline, 5-methyl-8-hydroxyquinoline, 6,8-dimethylcarbostyril, 5-amino-8-hydroxyquinoline, 6-methoxy-8-methylaminoquinoline, 6-methoxy-8-aminoquinoline, 2,8-dihydroxyquinoline, 5,8-dihydroxyquinoline, 6,8-dihydroxyquinoline, 7,8-dihydroxyquinoline, 2-methyl-8-aminoquinoline, 8-amino-7-methylquinoline, 8-amino-6-hydroxyquinoline, 5,8-diaminoquinoline, 6,8-diaminoquinoline, 7,8-diaminoquinoline, 5,8-diamino-6-methoxyquinoline, 8-methylquinoline-4-carboxylic acid, 2-methylquinoline-8-carboxylic acid, 5-methylquinoline-8-carboxylic acid, 8-hydroxycinchonic acid, 8-hydroxyquinaldic acid, 8-aminoquinaldic acid, 6-methoxyquinoline-8-carboxylic acid, quinoline-5,8-dicarboxylic acid, 2-phenylquinoline-4,8-dicarboxylic acid, quinoline-8-acetic acid, quinoline-8-acrylic acid, quinoline-8-carboxyaldehyde, 8-ethylquinoline-2-carboxyaldehyde, 3,8-dimethyl-2-carboxyaldehyde, 8-hydroxyquinoline-5-carboxyaldehyde, 7-hydroxyquinoline-8-carboxyaldehyde, phenyl 8-quinolyl ketone, 8-hydroxyquinolyl 5-methyl ketone, phenyl 8-quinolyl ketone oxime (syn and anti) and 8-benzoylaminoquinoline.

The 8-substituted compounds to be used in this invention further include quinoline compounds of the condensation type such as pyrrolo[4,5-h]quinoline and benzo-7,8-quinoline. Examples of most preferable quinoline are 8-phenylquinoline, 2,8-dimethylquinoline, 8-aminoquinoline, 8-hydroxyquinoline, 5-hydroxy-methyl-8-hydroxyquinoline, quinoline-8-carboxylic acid, 2,8-dihydroxyquinoline, 8-hydroxycinchonic acid, and quinoline-8-carboxyaldehyde.

According to this invention, the ferrocene compound and 8-substituted quinoline compound are added to polyolefin in a total amount of 0.01 to 20 parts by weight, preferably of 0.05 to 5 parts by weight, per 100 parts by weight of polyolefin. The ratio in amount of the 8-substituted quinoline compound to the ferrocene compound varies from 0.05 to 20, preferably 0.1 to 5 parts by weight, per one part by weight of ferrocene compound.

When a siloxane oligomer is added to polyolefin together with the ferrocene compound and 8-substituted quinoline compound in this invention, the resulting polyolefin composition displays remarkably improved electrical breakdown strength and additionally holds enhanced voltage endurance over a long period of immersion in water.

Examples of the siloxane oligomers having such effects are those represented by the following formulae X to XII:

  X

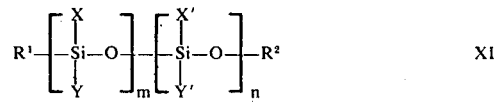  XI

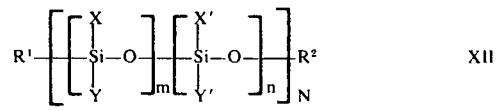  XII

In formulae X to XII, $R^1$ is alkyl, aryl, alkoxyl, hydroxy, aralkyl or alkenyl group, or halogen atom, $R^2$ is hydrogen atom, alkyl, aryl, aralkyl, alkenyl, or alkylhalosilyl group, and X, Y, X' and Y' are each alkyl, alkenyl, aryl, aralkyl, aralkenyl, hydroxyl or alkoxyl group, or halogen atom. Preceding organic groups, $R^1$, $R^2$, X, Y, X', Y', have carbon atoms less than 15.

In formula X, n is an integer of 2 to 100, preferably of 5 to 30, while in formula XI, m and n are each an integer of 1 to 60, preferably of 2 to 15. Preferably, the siloxane oligomers represented by formulae X and XI have a molecular weight of about 350 to about 30,000. In formula XII, N is preferably 2 to 50.

Further in formula XI, X, X', Y, and Y' may be different from each other except that X is identical to X', and Y to Y', and also except that X, X', Y, and Y' are all identical.

Listed in Table 2 are representative examples of the preferable siloxane oligomers in this invention.

Table 2

| Siloxan oligomer | Formula | $R^1$ | $R^2$ | X | Y | X' | Y' | n | m |
|---|---|---|---|---|---|---|---|---|---|
| 1 | X | $C_2H_5O$ | $C_2H_5$ | $CH_3$ | $CH_3$ | — | — | 5 | |
| 2 | X | '' | '' | '' | '' | — | — | 10 | |
| 3 | X | '' | '' | '' | '' | — | — | 15 | |
| 4 | X | Cl | $Si(CH_3)_2Cl$ | '' | '' | — | — | 5 | |
| 5 | X | '' | '' | '' | '' | — | — | 10 | |
| 6 | X | '' | '' | $CH_2=CH-$ | '' | — | — | 10 | |
| 7 | X | OH | H | $CH_3$ | '' | — | — | 5 | |
| 8 | X | '' | '' | '' | '' | — | — | 15 | |
| 9 | X | $OCH_3$ | $CH_3$ | '' | '' | — | — | 15 | |
| 10 | X | '' | '' | '' | '' | — | — | 10 | |
| 11 | XI | OH | H | $CH_3$ | $CH_3$ | $CH_2=CH$ | $CH_3$ | 1 | 9 |
| 12 | XI | '' | '' | '' | '' | '' | '' | 2 | 18 |
| 13 | XI | '' | '' | $C_6H_5$ | $C_6H_5$ | $CH_3$ | '' | 2 | 8 |
| 14 | XI | '' | '' | '' | '' | '' | '' | 4 | 16 |

Table 2-continued

| Siloxan oligomer | Formula | R¹ | R² | X | Y | X' | Y' | n | m |
|---|---|---|---|---|---|---|---|---|---|
| 15 | XI | $C_2H_5O$ | $C_2H_5$ | $CH_3$ | $CH_3$ | $CH_2=CH$ | '' | 3 | 3 |

According to this invention, the ferrocene compound, siloxane oligomer and 8-substituted quinoline compound are used in a total amount of about 0.01 to 20 parts by weight, preferably 0.03 to 5 parts by weight, and most preferably 0.03 to 3 parts by weight, per 100 parts by weight of polyolefin to assure an effective result. Further it is preferable to use the siloxane oligomer in a ratio of 0.05 to 20 parts by weight, most preferably of 0.05 to 5 parts by weight, per one part by weight of the ferrocene compound, while the ratio of the 8-substituted quinoline compound to the ferrocene compound is 0.05 to 20 parts by weight, more advantageously 0.5 to 5 parts by weight, of the former per one part by weight of the latter.

The composition of this invention can be prepared easily by mixing polyolefin, ferrocene compound, and quinoline compound, or polyolefin, ferrocene compounds, quinoline compounds, and siloxane oligomer by means of conventional mixing equipments such as Banbury mixer or open roll. A certain high-speed agitator such as Henschel mixer is also used for this purpose as disclosed in U.S. Pat. No. 3,736,173.

In the present invention, the composition may further contain usually available curing agent, curing co-agent, curing accelerator, antioxidant, mineral filler, ultraviolet absorbent, pigment, processing oil and other additives generally employed for rubber and plastics.

As a curing agent, curing co-agent and curing accelerator, the following examples are employed:

1. Organic peroxides, mixtures of peroxides and sulfur, or mixtures of peroxides and dioximes. Examples of the peroxides include dicumyl peroxide, di-tertiarybutyl peroxide, 1,1'-di-tertiary-butyl peroxyethane and 1,4-bis(tertiary-butyl peroxy) diisopropylbenzene, and examples of the dioximes include p-quinone dioxime and p,p'-dibenzylquinone dioxime.

2. Thiurams, mixtures of thiurams and thiazoles, mixtures of thiurams and imidazolines, mixtures of thiurams and litharge, or mixtures of thiurams and dithiocarbamates. Examples of the thiurams include tetramethylthiuram monosulfide, tetramethylthiuram disulfide, dimethyldiphenylthiuram disulfide, dipentamethylenethiuram monosulfide and dipentamethylenethiuram tetrasulfide. Examples of the dithiocarbamates include zinc dimethyldithiocarbamate, zinc diethyldithiocarbamate, selenium diethyldithiocarbamate and tellurium diethyldithiocarbamate. Examples of the thiazoles include 2-mercaptobenzothiazole, dibenzothiazyl disulfide and a zinc salt of 2-mercaptobenzothiazole and N-diethyl-2-benzothiazyl. A suitable example of the imidazolines is 2-mercaptoimidazoline.

3. Mixtures of zinc oxide, magnesium oxide and imidazolines such as 2-mercaptoimidazoline.

4. Mixtures of the above-described dioximes and metal oxides.

The curing agent mentioned above is incorporated in an amount of 0.5 to 10 parts by weight per 100 parts by weight of polyolefin.

To obtain a cured product of the present composition, such processes are actuated by the heating through high pressure steam, infrared rays, molten salt, high frequency potential, or like heating means.

The cured composition of the present invention possesses more excellent electrical breakdown strength rather than uncured one of the invention.

If the composition of this invention additionally contains a small amount of polyhydric alcohol, dispersant, surfactant or unsaturated polymer, or a mixture thereof, still another improvement will be attained in electrical breakdown strength accompanying with narrow scatter in breakdown strength.

Preferably, these substances are used in an amount of 0.05 to 10 parts by weight, more preferably of 0.1 to 5 parts by weight, per one part by weight of total amount of ferrocene compound and 8-substituted quinoline compound or of ferrocene compound, siloxane oligomer and 8-substituted compound.

Preferable polyhydric alcohols are those having at least two hydroxyl groups in the molecule and having molecular weight of 62–1000. Examples thereof are as follows:

1. Aliphatic polyhydroxy compounds such as ethylene glycol, propylene glycol, pentaerythritol, trimethylene glycol, polyethylene glycol, glycerin, etc.

2. Alicyclic polyhydroxy compounds such as 1-hydroxymethyl-1-cyclobutanol, cyclohexanediol, methylcyclopentanediol, hydroxymethylcyclohexanol, 1,2-dimethyl-2,3-cyclopentanediol, etc.

3. Aromatic polyhydroxy compounds such as catechol, resorcin, phlorglucin, 1,2,4-trihydroxybenzene, hydroxybenzyl alcohol, phthalyl alcohol, dihydroxybiphenyl, benzpinacol, triphenylethylene glycol, hydroquinone, 2,3-dihydroxynaphthalene, 2,6-resorcylic acid, 2,2',4,4'-tetrahydroxydiphenylsulfide, bisresorcin-ethylene ether, bis(2,3-hydroxyphenyl)urea, 2,4-resorcylic acid ethanol amide, 2-hydroxynaphthalene-3-carboyldiethanolamide, 3-hydroxynaphthalene-3-carboylethanolamide, etc.

Among these polyhydric alcohols, especially preferable are polyethylene glycol, erythritol, pentaerythritol, resorcin and hydroquinone.

Examples of the dispersant are those generally used for rubber and plastics such as metal salt of higher fatty acid, hydrophilic ester of higher fatty acid, polyethylene glycol alkyl ether, polyethylene glycol ether, thioether, thiobutyrate, and mixtures thereof.

Preferable surfactants are of the following types:

1. Amine type
   a. Primary amines such as octylamine, tetradecylamine, beef tallow alkylamine, etc.
   b. Tertiary amines such as oleyldimethylamine, dodecyldimethylamine, tetradecyldimethylamine, etc.
   c. Diamines such as beef tallow alkylpropylenediamine,
2. Complex type such as amine complex
3. Nonionic type
   a. Amine-ethylene oxide adducts such as hydroxyethylene dodecylamine, polyoxyethylene dodecylamine, polyoxyethylene octadecylamine, polyoxyethylene beef tallow alkylpropylenediamine, etc.
b. Ether type such as polyoxyethylene oleyl ether, polyoxyethylene cetyl ether, etc.
c. Alkylphenols such as polyoxyethylene, alkylaryl ethers.
d. Ester type such as polyethylene glycol monolaurate, polyethylene glycol monostearate, etc.
e. Partial esters of polyhydric alcohols such as sorbitan monostearate, sorbitan monopalmitate, sorbitan sesquioleate, etc.
f. Alkylamide type such as polyoxyethylene alkylamide, etc.
g. Alkylthioethers such as polyoxyethylene dodecylmercapto ether, etc.
4. Cationic type
   a. Quaternary amine halides such as dodecyltrimethyl ammonium chloride, hexadecyltrimethyl ammonirm chloride, octadecyltrimethyl ammonium chloride, polyoxyethylene dodecylmonomethyl ammonium chloride, etc,
   b. Alkylamines such as polyoxyethylene alkylamine, etc.
   c. Polyamineamide and imidazoline types.
5. Anionic type
   a. Fatty acid soaps such as sodium and calcium salts of fatty acid.
   b. Arylsulfonate such as sodium alkylbenzenesulfonate, sodium alkylarylsulfonate, etc.
   c. Sodium salts of sulfate ester of alcohols and phosphate esters of alcohols.
6. Betaine type
   a. Amine type betaine such as alkyl(diaminoethyl)glycine.

The above-mentioned unsaturated polymers are those containing at least 0.5, preferably at least one unsaturated bond or unsaturated atomic group selected from the group consisting of C=C, aromatic ring and C ≅ N per unit structure constituting the polymer. Examples are 1,2-polybutadiene, styrene-butadiene copolymer, 1,4-polybutadiene, nitrile-butadiene copolymer, and the like.

The reasons why the compositions of this invention have outstanding electrical breakdown strength are presumably as follows: The ferrocene compound may act as a capture of inactivate highly energized electrons, while the 8-substituted quinoline compound may inactivate a very small amount of metal ions, particularly of copper ions, which are thought to be present as impurities mainly in the polyolefin, thereby improving the electrical breakdown strength of the polyolefin compound. When both compounds are conjointly present, the metal ion capturing action of the latter may promote the electron capturing or inactivating action of the former to result in an outstanding synergetic effect. Moreover where the siloxane oligomer is also present, the oligomer may fill the voids contained in the polyolefin and expel the molecule of invading water, materially enhancing the synergetic effect of ferrocene compound and 8-substituted quinoline compound.

The addition of the foregoing unsaturated polymer serves to render more uniform the interface between the crystalline portion and the amorphous portion in the polymer and thereby to secure the structural homogenity in the interior of the polymer, while the dispersant added to the polyolefin compound permits the other additives to be dispersed more uniformly in the composition. Thus both ingredients are considered to be effective for improving the breakdown strength.

The composition of the present invention is more particularly described and explained by means of the following illustrative Examples.

EXAMPLES 1 TO 22 AND COMPARISON EXAMPLES 1 TO 4

Low-density polyethylene (trade mark: "Yukaron ZF 36", product of Mitsubishi Petrochemical Co., Ltd., Japan, $d=0.915$, M.I.=1.0) and the additives listed in Table 3 were kneaded together in a roll mill at 110° to 115°C. for 10 minutes to prepare the compositions of Examples and Comparison Examples. Each composition was tested by the method to be described later after having been heated to 120°C. for 20 minutes and also without subjecting to such heat treatment to determine the electrical breakdown strength of the composition. Table 4 gives the arithmetic mean value and minimum-to-maximum range of ten test data of the composition.

The ferrocene polymers used in Examples were of the same structure as those listed in Table 1 with the corresponding reference numerals and were prepared by the methods described below. The siloxane oligomers used in Examples and Comparison Examples are shown in Table 2 with the corresponding reference numerals.

[Methods for preparing ferrocene polymers]

Ferrocene polymers 1 to 10 and 15 were prepared by subjecting ferrocene and the carbonyl compound listed in Table 3 to dehydration condensation in a polar solvent in the presence of Lewis acid as a catalyst under the conditions shown in Table 3. Each polymer obtained was rinsed with water and then washed with a mixture of benzene and petroleum ether for purification.

Table 3

| Ferrocene polymer (No.) | Carbonyl compound (wt. part per one wt. part of ferrocene) | | Reaction conditions | | | |
|---|---|---|---|---|---|---|
| | | | Temp. (°C.) | Time (hr.) | Solvent | Catalyst |
| 1 | Benzaldehyde | (0.84) | 120 | 1 | DMF | $FeCl_3$ |
| 2 | p-Tolualdehyde | (0.84) | 120 | 1 | DMF | $FeCl_3$ |
| 3 | p-Anisaldehyde | (0.84) | 120 | 1 | DMAC | $FeCl_3$ |
| 4 | Crotonaldehyde | (0.84) | 110 | 1 | n-Methyl-2-pyrrolidone | $SnCl_2$ |
| 5 | Cinnamic aldehyde | (0.84) | 120 | 1 | DMAC | $AlCl_3$ |
| 6 | n-Nonylaldehyde | (0.84) | 120 | 2 | DMF | $SnCl_2$ |
| 7 | Salicylaldehyde | (0.84) | 120 | 2 | DMF | $FeCl_3$ |
| 8 | p-Dimethylamino-benzaldehyde | (0.84) | 120 | 1 | DMF | $FeCl_3$ |
| 9 | Acetophenone | (0.9) | 140 | 2 | DMF | $SnCl_2$ |
| 10 | Benzophenone | (0.95) | 140 | 2 | DMF | $FeCl_3$ |
| 15 | Cyclohexane | (0.6) | 140 | 2 | p-Methyl-2- | $SnCl_2$ |

Table 3-continued

| Ferrocene polymer (No.) | Carbonyl compound (wt. part per one wt. part of ferrocene) | Reaction conditions | | | |
|---|---|---|---|---|---|
| | | Temp. (°C.) | Time (hr.) | Solvent | Catalyst |
| | | | | pyrrolidone | |

(Note)
DMF: Dimethylformamide
DMAC: Dimethylacetamide

Ferrocene polymer 11 was prepared by reacting 1 part by weight of ferrocene with 1 part by weight of p-dichlorobenzene at 175°C. for 2 hours in the presence of di-tert-butyl peroxide and thoroughly washing the resulting product with a mixture of benzene-petroleum ether (1 : 1) for purification.

Ferrocene polymer 12 was prepared in the same manner as ferrocene polymer 11 except that 1 part by weight of α-bromonaphthalene was used in place of p-dichlorobenzene.

Ferrocene polymer 14 was prepared by subjecting a mixture of ferrocene and p-phthaloyl chloride (in equal amounts by weight) to Friedel Crafts reaction in n-hexane at 70°C. in the presence of $AlCl_3$, as a catalyst and thoroughly washing the resulting product with a mixture of benzene and petroleum ether (1 : 1) for purification.

Ferrocene polymer 13 was prepared by reducing the ferrocene polymer 14 with lithium aluminum hydride in tetrahydrofuran.

Ferrocene polymer 16 was prepared by subjecting 1,1'-(1,1'-epoxydiethyl)ferrocene to ring-opening polymerization at 75°C. in toluene in the presence of $BF_3 \cdot OEt_2$ catalyst.

[Method for determining electrical breakdown strength]

Breakdown strength was determined according to the improved method of Kitchen-Pratt method (described in D. W. Kitchen and O. S. Pratt, AIEE, PAS, p. 112, June, 1962) which is generally adopted for evaluating the electrical breakdown strength of polymers. A brief explanation of the improved Kitchen-Pratt method is as follows:

A specimen, 25 mm. × 25 mm. × 3 mm, was heated from a room temperature to 120°C. and then maintained at this temperature for 5 minutes. A polished sewing needle, 30° in needle tip angle and 3 μm in the radius of needle tip curvature, was treated under the same temperature conditions as the specimen and was then inserted into the specimen from the center of 25 mm. × 3 mm. surface thereof at right angle to the surface, toward the opposite side at a rate of 3 mm./min. The needle was placed into the specimen to such a depth that the distance between the needle tip and the opposite surface was 10 mm. The specimen having the needle inserted therein was cooled and then left to stand at a room temperature for 7 days. A.C. voltage was applied between the needle inserted in the specimen and the opposite surface grounded directly at 8 kV initially, and was thereafter elevated stepwise by 2 kV every 10 minutes. With easy elevations of voltage, the specimen was inspected with the unaided eye or through a microscope to check the occurrence of electrical tree. The voltage (kV) at which electrical tree initiates is shown in Table 4 and Table 5 as the breakdown strength of the specimen.

Table 4

| | | Additives (part by weight) | | Electrical breakdown strength (KV) | | | |
|---|---|---|---|---|---|---|---|
| | | | | Original | | After heating at 120°C for 20 minutes | |
| | | | | Range | Average | Range | Average |
| Comp. Ex. | 1 | None | | 8–14 | 9.8 | up to 8 | up to 8 |
| " | 2 | Ferrocene | 0.5 | 12–22 | 20.6 | 8–12 | 10.6 |
| " | 3 | 8-Hydroxyquinoline | 0.5 | 10–20 | 14.8 | 8–10 | 9.7 |
| " | 4 | Siloxane oligomer 1 | 0.5 | 10.16 | 12.5 | 8–10 | 9.4 |
| Ex. | 1 | Ferrocene | 0.1 | 16–22 | 22.1 | 10–18 | 13.8 |
| | | 8-Hydroxyquinoline | 0.5 | | | | |
| " | 2 | Ferrocene | 0.5 | 18–26 | 23.2 | 10–20 | 16.2 |
| | | 8-Hydroxyquinoline | 0.5 | | | | |
| " | 3 | Acetyl ferrocene | 0.5 | 16–26 | 21.8 | 12–24 | 14.8 |
| | | 8-Phenyl quinoline | 0.5 | | | | |
| | | Ferrocene | 0.5 | | | | |
| " | 4 | 8-Hydroxyquinoline | 0.5 | 16–24 | 21.8 | 12–22 | 14.6 |
| | | Pentaerythritol | 0.4 | | | | |
| | | Ferrocene | 0.5 | | | | |
| " | 5 | Siloxane oligomer 2 | 0.5 | 16–28 | 22.6 | 8–16 | 13.6 |
| | | 8-Hydroxyquinoline | 0.5 | | | | |
| | | Ferrocene | 0.5 | | | | |
| " | 6 | Siloxane oligomer 3 | 0.5 | 16–28 | 24.2 | 8–16 | 14.2 |
| | | 8-Hydroxyquinoline | 0.5 | | | | |
| | | Ferrocene | 0.5 | | | | |
| " | 7 | Siloxane oligomer 4 | 0.5 | 14–26 | 22.6 | 8–16 | 13.4 |
| | | 8-Hydroxyquinoline | 0.5 | | | | |
| | | Ferrocene | 0.5 | | | | |
| " | 8 | Siloxane oligomer 1 | 0.5 | 14–28 | 23.2 | 10–16 | 14.0 |
| | | 8-Hydroxyquinoline | 0.5 | | | | |
| | | Ferrocene | 0.5 | | | | |
| " | 9 | Siloxane oligomer 9 | 0.5 | 14–24 | 22.2 | 8–16 | 13.2 |
| | | 8-Hydroxyquinoline | 0.5 | | | | |
| | | Ferrocene | 0.5 | | | | |
| " | 10 | Siloxane oligomer 10 | 0.5 | 14–28 | 23.6 | 10–16 | 14.4 |
| | | 8-Hydroxyquinoline | 0.5 | | | | |
| | | Ferrocene | 0.5 | | | | |
| " | 11 | Siloxane oligomer 13 | 0.5 | 16–26 | 22.6 | 8–16 | 13.8 |

Table 4-continued

| | | Additives (part by weight) | | Electrical breakdown strength (KV) | | | |
|---|---|---|---|---|---|---|---|
| | | | | Original | | After heating at 120°C for 20 minutes | |
| | | | | Range | Average | Range | Average |
| | | 8-Hydroxyquinoline | 0.5 | | | | |
| | | Ferrocene | 0.5 | | | | |
| " | 12 | Siloxane oligomer 15 | 0.5 | 16–26 | 22.0 | 10–16 | 14.3 |
| | | 8-Hydroxyquinoline | 0.5 | | | | |
| | | N,N-dimethylamino-methylferrocene | 0.5 | | | | |
| " | 13 | Siloxane oligomer 2 | 0.5 | 18–28 | 24.5 | 8–18 | 15.3 |
| | | 2,8-Dimethylquinoline | 0.5 | | | | |
| | | Ethylene glycol | 0.5 | | | | |
| | | Trimethylsilyl-ferrocene | 0.5 | | | | |
| " | 14 | Siloxane oligomer 5 | 0.5 | 16–28 | 24.3 | 12–16 | 14.8 |
| | | Quinoline-8-carboxylic acid | 0.5 | | | | |
| | | cis-1,2-Polybutadiene | 0.5 | | | | |
| " | 15 | Ferrocene polymer 1 | 0.5 | 14–24 | 19.0 | 8–14 | 12.0 |
| | | 8-Hydroxyquinoline | 0.5 | | | | |
| " | 16 | Ferrocene polymer 2 | 0.5 | 14–22 | 18.8 | 10–16 | 14.2 |
| | | 8-Hydroxyquinoline | 0.5 | | | | |
| " | 17 | Ferrocene polymer 3 | 1.0 | 14–26 | 19.5 | 8–18 | 13.1 |
| | | 8-Hydroxyquinoline | 0.5 | | | | |
| | | Ferrocene polymer 4 | 0.5 | | | | |
| " | 18 | Siloxane oligomer 5 | 0.5 | 14–26 | 19.0 | 8–14 | 12.8 |
| | | 8-Hydroxyquinoline | 0.5 | | | | |
| | | Ferrocene polymer 5 | 0.5 | | | | |
| " | 19 | Siloxane oligomer 8 | 0.5 | 16–24 | 18.6 | 14–18 | 13.6 |
| | | 8-Hydroxyquinoline | 0.5 | | | | |
| | | Ferrocene polymer 7 | 0.5 | | | | |
| " | 20 | Siloxane oligomer 11 | 0.5 | 14–28 | 21.2 | 12–18 | 14.7 |
| | | 8-Hydroxyquinoline | 0.5 | | | | |
| | | n-Butylferrocene | 0.2 | | | | |
| | | Ferrocene polymer 16 | 0.3 | | | | |
| " | 21 | Siloxane oligomer 14 | 0.5 | 14–28 | 18.4 | 12–16 | 14.0 |
| | | 8-Aminoquinoline | 0.5 | | | | |
| | | Quinoline-8-carboxylic acid | 0.2 | | | | |
| | | Ferrocene polymer 12 | 0.3 | | | | |
| " | 22 | Siloxane oligomer 7 | 0.5 | 14–24 | 20.0 | 10–20 | 14.4 |
| | | 8-Hydroxycinchonic acid | 0.5 | | | | |
| | | Polyethylene glycol ether | 0.5 | | | | |

EXAMPLES 23 TO 38 AND COMPARISON EXAMPLES 5 TO 8

One hundred parts by weight of the same polyethylene as used in the foregoing Examples, 2 parts by weight of dicumyl peroxide and the additives listed in Table 5 were kneaded together in a roll mill at 115° to 120°C. for 15 minutes to prepare the compositions of Examples and Comparison Examples. Each composition was then cross-linked by pressing at a temperature of 165°C. and at a pressure of 150 kg./cm.² for 45 minutes to obtain a cross-linked sheet of 3 mm. in thickness. A specimen, 25 mm. × 25 mm. × 3 mm., was cut off from each sheet obtained, and a similar specimen was also prepared from the sheet after it was heated at 180°C. for 20 minutes. Table 5 gives the arithmetic mean value and minimum-to-maximum range of ten test data of the specimen.

Table 5

| | | Additives (part by weight) | | Electrical breakdown strength (KV) | | | |
|---|---|---|---|---|---|---|---|
| | | | | Original | | After heating at 180°C for 20 minutes | |
| | | | | Range | Average | Range | Average |
| Comp. Ex. | 5 | None | | 16–20 | 18.1 | up to 8 | up to 8 |
| " | 6 | 8-Hydroxyquinoline | 3.0 | 20–30 | 25.5 | 8–16 | 14.8 |
| " | 7 | Ferrocene | 0.5 | 26–34 | 30.6 | 10–20 | 16.0 |
| " | 8 | Siloxane oligomer 1 | 0.5 | 24–32 | 26.8 | 10–18 | 15.8 |
| Ex. | 23 | Ferrocene | 0.1 | 28–36 | 32.6 | 24–32 | 26.2 |
| | | 8-Hydroxyquinoline | 0.5 | | | | |
| | | Ferrocene | 1.0 | | | | |
| " | 24 | 8-Hydroxyquinoline | 0.5 | 30–40 | 36.2 | 30–36 | 32.4 |
| | | Ferrocene | 0.5 | | | | |
| " | 25 | 8-Hydroxyquinoline | 0.5 | 32–42 | 36.8 | 28–40 | 32.8 |
| | | Pentaerythritol | 0.4 | | | | |
| | | Ferrocene | 0.5 | | | | |
| " | 26 | 8-Hydroxyquinoline | 0.5 | 36–42 | 36.8 | 32–40 | 35.2 |
| | | Cis-1,2-polybutadiene | 2.0 | | | | |
| | | Ferrocene | 0.5 | | | | |
| " | 27 | Siloxane oligomer 1 | 0.5 | 30–40 | 33.6 | 14–24 | 20.0 |
| | | 8-Hydroxyquinoline | 0.5 | | | | |
| | | Ferrocene | 0.5 | | | | |
| " | 28 | Siloxane oligomer 2 | 0.5 | 30–42 | 35.2 | 18–26 | 21.8 |
| | | 8-Hydroxyquinoline | 0.5 | | | | |
| | | Ferrocene | 0.5 | | | | |

Table 5-continued

| | | Additives (part by weight) | | Electrical breakdown strength (KV) | | | |
|---|---|---|---|---|---|---|---|
| | | | | Original | | After heating at 180°C for 20 minutes | |
| | | | | Range | Average | Range | Average |
| '' | 29 | Siloxane oligomer 3<br>8-Hydroxyquinoline<br>1,4-Polybutadiene | 0.5<br>0.5<br>0.5 | 34–50 | 43.1 | 22–30 | 26.0 |
| '' | 30 | Ferrocene<br>Siloxane oligomer 6<br>8-Hydroxyquinoline<br>Octylamine | 0.5<br>0.5<br>0.5<br>0.5 | 30–40 | 35.3 | 18–26 | 21.5 |
| '' | 31 | Ferrocene<br>Siloxane oligomer 8<br>8-Hydroxyquinoline<br>Hydroxyethylene<br>dodecylamine | 0.5<br>0.5<br>0.5<br>0.5 | 32–44 | 35.8 | 18–26 | 21.7 |
| '' | 32 | Ferrocene<br>Siloxane oligomer 9<br>8-Hydroxyquinoline<br>Octadecyltrimethyl<br>ammonium chloride | 0.5<br>0.5<br>0.5<br>0.5 | 30–42 | 37.0 | 18–24 | 21.5 |
| '' | 33 | Ferrocene<br>Siloxane oligomer 10<br>8-Hydroxyquinoline<br>Sodium dodecylbenzen-<br>sulfonate | 0.5<br>0.5<br>0.5<br>0.5 | 28–42 | 37.1 | 16–28 | 21.6 |
| '' | 34 | Cinnamoyl ferrocene<br>Siloxane oligomer 12<br>8-Hydroxyqinoline | 0.5<br>0.5<br>0.5 | 28–42 | 36.1 | 18–30 | 22.4 |
| '' | 35 | Ferrocene polymer 6<br>5-Hydroxymethyl-8-<br>hydroxyquinoline | 0.5<br>0.5 | 26–40 | 35.2 | 16–24 | 20.8 |
| '' | 36 | Ferrocene polymer 8<br>2,8-Dihydroxyquinoline<br>Siloxane oligomer 2 | 0.5<br>0.5<br>0.5 | 30–40 | 34.8 | 18–28 | 22.8 |
| '' | 37 | Ferrocene polymer 9<br>Quinoline-8-<br>carboxyaldehyde<br>Siloxane oligomer 1 | 0.5<br>0.5<br>0.5 | 32–44 | 36.0 | 20–30 | 23.2 |
| '' | 38 | Ferrocene polymer 10<br>2,8-Dihydroxyquinoline<br>Siloxane oligomer 2 | 0.5<br>0.5<br>0.5 | 30–42 | 35.2 | 18–30 | 23.0 |

EXAMPLES 39 TO 47 AND COMPARISON EXAMPLES 9 TO 10

The ingredients listed in Table 6 shown below were kneaded together by hot rolls at 90°C. for 10 minutes to prepare the compositions of Examples and Comparison Examples, which were then heated at 160°C. for 40 minutes to obtain vulcanized sheets of 1 mm. in thickness. The properties and electrical breakdown stength of each sheet are also given in Table 6.

Table 6

| | Comp. Ex. 9 | Example 39 | Example 40 |
|---|---|---|---|
| Ethylene-propylene copolymer *1 | 100 | 100 | 100 |
| Ethylene-vinyl acetate copolymer *2 | — | — | — |
| Dicumyl peroxide | 2.7 | 2.7 | 2.7 |
| Sulfur | 0.3 | 0.3 | 0.3 |
| Zinc white | 10 | 1 | 10 |
| Whitetex Clay | 80 | 80 | 80 |
| Stearic acid | 1 | 1 | 1 |
| Triallyl cyanurate | — | — | — |
| Nocrac-MB *3 | 1 | 1 | 1 |
| Kind and amount of ferrocene compound *4 | — | Ferrocene 0.5 | Ferrocene 0.5 |
| Kind and amount of siloxane oligomer *5 | — | SO-4, 0.5 | SO-5, O.5 |
| 8-Hydroquinoline | — | 0.5 | 0.5 |
| Ethylene glycol | — | — | — |
| 200% Modulus (Kg/mm.²) | 0.30 | 0.31 | 0.30 |
| Tensile strength (Kg/mm.²) | 1.05 | 1.06 | 1.00 |
| Elongation (%) | 625 | 615 | 603 |
| A.C. breakdown strength KV/mm. *6 | 41.1 | 66.5 | 70.5 |

| | Example 41 | Comp. Ex. 10 | Example 42 |
|---|---|---|---|
| Ethylene-propylene copolymer *1 | 100 | — | — |
| Ethylene-vinyl acetate copolymer *2 | — | 100 | 100 |
| Dicumyl peroxide | 2.7 | 2 | 2 |
| Sulfur | 0.3 | — | — |
| Zinc white | 10 | 5 | 5 |
| Whitetex Clay | 80 | 80 | 80 |

Table 6-continued

|  | Comp. Ex. 9 | Example 39 | Example 40 |
|---|---|---|---|
| Stearic acid | 1 | 1 | 1 |
| Triallyl cyanurate | — | 2 | 2 |
| Nocrac-MB *3 | 1 | 1 | 1 |
| Kind and amount of ferrocene compound *4 | Ferrocene 0.5 | — | Ferrocene 0.5 |
| Kind and amount of siloxane oligomer *5 | SO-4, 0.5 | — | SO-4, 0.5 |
| 8-Hydroquinoline | 0.5 | — | 0.5 |
| Ethylene glycol | 0.5 | — | — |
| 200% Modulus (Kg/mm.$^2$) | 0.28 | 0.50 | 0.51 |
| Tensile strength (Kg/mm.$^2$) | 1.08 | 0.76 | 0.82 |
| Elongation (%) | 631 | 368 | 349 |
| A.C. breakdown strength KV/mm. *6 | 69.6 | 37.5 | 61.6 |

|  | Example 43 | Example 44 | Example 45 |
|---|---|---|---|
| Ethylene-propylene copolymer *1 | — | — | — |
| Ethylene-vinyl acetate copolymer *2 | 100 | 100 | 100 |
| Dicumyl peroxide | 2 | 2 | 2 |
| Sulfur | — | — | — |
| Zinc white | 5 | 5 | 5 |
| Whitetex Clay | 80 | 80 | 80 |
| Stearic acid | 1 | 1 | 1 |
| Triallyl cyanurate | 2 | 2 | 2 |
| Nocrac-MB *3 | 1 | 1 | 1 |
| Kind and amount of ferrocene compound *4 | Ferrocene | PFC-11 | PFC-13 |
| Kind and amount of siloxane oligomer *5 | SO-5, 0.5 | SO-2, 0.5 | SO-2, 0.5 |
| 8-Hydroquinoline | 0.5 | 0.5 | 0.5 |
| Ethylene glycol | 0.5 | — | — |
| 200% Modulus (Kg/mm.$^2$) | 0.53 | 0.52 | 0.58 |
| Tensile strength (Kg/mm.$^2$) | 0.81 | 0.80 | 0.80 |
| Elongation (%) | 352 | 385 | 343 |
| A.C. breakdown strength KV/mm. *6 | 62.4 | 63.8 | 62.0 |

|  | Example 46 | Example 47 |
|---|---|---|
| Ethylene-propylene copolymer *1 | — | — |
| Ethylene-vinyl acetate copolymer *2 | 100 | 100 |
| Dicumyl peroxide | 2 | 2 |
| Sulfur | — | — |
| Zinc white | 5 | 5 |
| Whitetex Clay | 80 | 80 |
| Stearic acid | 1 | 1 |
| Triallyl cyanurate | 2 | 2 |
| Nocrac-MB *3 | 1 | 1 |
| Kind and amount of ferrocene compound *4 | PFC-14 0.5 | PFC-15 0.5 |
| Kind and amount of siloxane oligomer *5 | SO-1, 0.5 | SO-1, 0.5 |
| 8-Hydroquinoline | 0.5 | 0.5 |
| Ethylene glycol | 0.5 | 0.5 |
| 200% Modulus (Kg/mm.$^2$) | 0.51 | 0.59 |
| Tensile strength (Kg/mm.$^2$) | 0.79 | 0.85 |
| Elongation (%) | 377 | 388 |
| A.C. breakdown strength KV/mm. *6 | 64.0 | 63.2 |

Note:
*1: "Esprene 301A", product of Sumitomo Chemical Co., Ltd., Japan.
*2: "Evaflex 40", product of Mitsui Polychemical Co., Ltd., Japan (containing 12 % by weight of vinyl acetate).
*3: 2-Mercaptobenzimidazole
*4: "PFC-11, -13 . . ." represents "ferrocene polymer 11, 13 . . ."
*5: "SO-1, -2 . . ." represents "siloxane oligomer 1, 2 . . ."
*6: At a room temperature, an initial voltage of 25 kV was applied to a vulcanized sheet interposed between flat disc electrodes, 50 mm. in diameter, and the voltage was thereafter elevated stepwise at a rate of 2 kV/min.

[Cable test]

Onto a stranded copper conductor having a sectional area of 100 mm.$^2$ and having semiconducting tape (1 mm. in thickness and made of nylon fabric coated with semiconducting butyl rubber) wounded therearound with 50% lap, each composition of Comparison Example 5, Example 28 or Example 29 was extruded from an extruder to form an insulating layer, 4 mm. in thickness, on the conductor. The insulating layer was hot-cured in steam at 20 atm. and then cooled with water. Subsequently, the same semiconducting tape as above was wound around the cured insulating layer with 50% lap, and 0.2 mm. thick copper tape was further wound therearound with 25% lap. Polyvinyl chloride was then applied, in a thickness of 1 mm., onto the covered conductor by extrusion. In this way, Cable-2 and Cable-3 were prepared from the compositions of Comparison Example 5, Example 28 and Example 29, respectively. According to the procedures to be described later, the cables were tested for long-term A.C. breakdown strength and stability during under-water voltage application. The results are shown in Table 7.

Table 7

| Specimen | Long-term A.C. breakdown strength (kV/mm.)[*7] | | Stability during underwater voltage application (number of water trees)[*8] | |
|---|---|---|---|---|
| | Range | Average | After 190 days | After 365 days |
| Cable-1 | 29–42 | 35.4 | 6.0 | 7.0 |
| Cable-2 | 38–50 | 45.0 | 0 | 0 |
| Cable-3 | 39–52 | 45.7 | 0 | 0 |

Note:
[*7]: A.C. voltage, 70 % of the anticipated breakdown voltage, was applied to a 5 m. long cable piece, and the voltage was thereafter elevated stepwise by 5 kV every 30 minutes. Ten pieces were tested, and the results are listed as minimum-to-maximum range and arithmetic mean of ten values obtained.
[*8]: Both sides of the insulating layer of 5 m. long cable piece were completely filled with water, and A.C. voltage of 6.9 kV and 60 Hz. was continuously applied across the conductor and the ground. Further in the meantime, alternating current of 500 A was passed through the cable conductor for 4 hours (with which the temperature of the cable was elevated to 90°C.), and then the cable was cooled to stand for 8 hours without current.

This procedure was repeated. Upon lapses of 190 days and 365 days, 5 cable pieces thus treated were observed on the occurrence of the water trees in the insulating layer of the cable pieces. The inspection was carried out as follows: 0.5 mm. thick slice cut from each insulating layer of cables in perpendicular direction to cable axis was observed througth a microscope at 100 times magnification and the number of water trees of longer than 240 μm in length were counted. Table 7 shows the average of 5 pieces.

What we claim is:

1. A polyolefin composition for electrical insulation comprising polyolefin, a ferrocene compound which is at least one member selected from the group consisting of ferrocene and ferrocene compounds represented by the following formulae I to VIII:

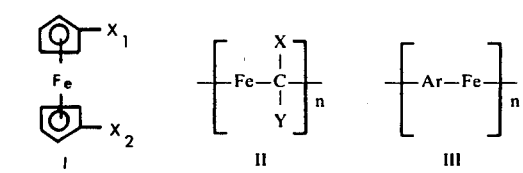

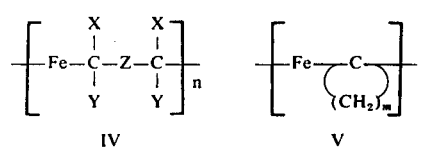

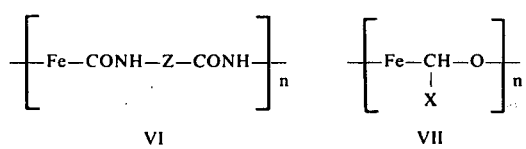

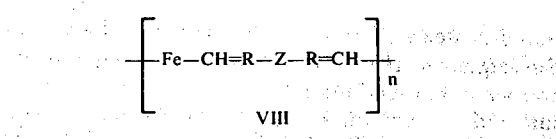

wherein, in formula I, $X_1$ and $X_2$ are each hydrogen or halogen atom, or alkyl, aryl, acyl, amino, carboxyl, carboalkoxyl or silyl group, respectively;

in formulae II to VIII, Fe is ferrocene (X-$C_5H_5$-Fe-$C_5H_5$) skeleton, —Fe— is a 1,2-, 1,3-, or 1,1'-disubstituted ferrocenylene unit and n is an integer of 2 to 10,000;

in formula II, X and Y are halogen or hydrogen atom, or alkyl, alkenyl, aryl, aralkyl, aralkenyl, hydroxyl or alkoxyl group, respectively;

in formula III, Ar is o-, m- or p-phenylene or other arylene group, such as naphthylene or anthracenylene, with or without a substituent thereon;

in formula IV, X and Y are each the same as X and Y of formula II, or X and Y may form a carbonyl group together with the carbon atom connected with X and Y, and Z is alkylene, arylene, aralkylene, alkenylene or aralkenylene group;

in formula V, m is an integer of 2 to 12 and the carbon ring composed of carbon atoms and —($CH_2$)$_m$— may contain an unsaturated bond and have a substituent thereon;

in formulae VI and VIII, Z is the same as Z in formula IV, R in formula VIII being nitrogen atom or methine group;

in formula VII, X is the same as X in formula II;

said organic groups, $X_1$, $X_2$ in formula I, X, Y in formulae II and IV, and X in formula VII having carbon atoms of less than 30; and said organic groups, Ar in formula III and Z in formulae, IV, VI and VIII, having carbon atoms of less than 40 and 8-substituted quinoline compound having the formula

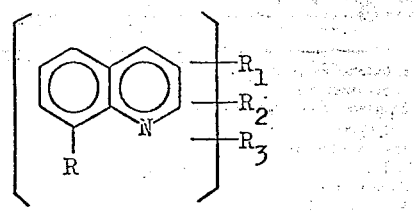

wherein R is an alkyl, aryl, amino, alkenyl, acyl, amide or hydroxyl group, said organic group having carbon atoms of less than 30, and $R_1$, $R_2$ and $R_3$ are an alkyl, amino, alkoxyl, carboxyl group or hydrogen, those being substituted at positions other than the 8-position of quinoline ring, the total amount of the ferrocene compound and the 8-substituted quinoline compound being 0.01 to 20 parts by weight per 100 parts by weight of the polyolefin, the ratio of the 8-substituted quinoline compound to the ferrocene compound being 0.05 to 20 parts by weight of the 8-substituted quinoline compound per one part by weight of the ferrocene compound.

2. A polyolefin composition for electrical insulation comprising polyolefin, a ferrocene compound which is at least one member selected from the group consisting of ferrocene and ferrocene compounds, represented by the following formulae I to VIII:

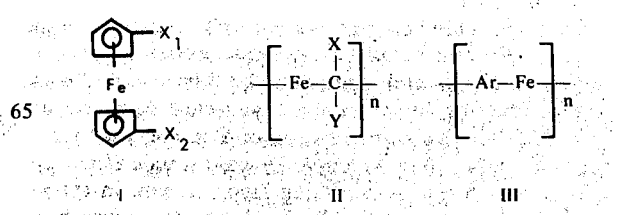

-continued

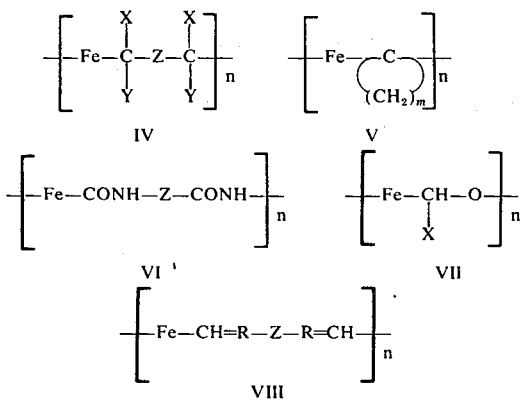

wherein, in formula I, $X_1$ and $X_2$ are each hydrogen or halogen atom, or alkyl, aryl, acyl, amine, carboxyl, carboalkoxyl or silyl group, respectively;
in formulae II to VIII, Fe is ferrocene ($X-C_5H_5$-Fe-$C_5H_5$) skeleton, —Fe— is a 1,2-, 1,3-, or 1,1'-disubstituted ferrocenylene unit and n is an integer of 2 to 10,000;
in formula II, X and Y are halogen or hydrogen atom, or alkyl, alkenyl, aryl, aralkyl, aralkenyl, hydroxyl or alkoxyl group, respectively;
in formula III, Ar is o-, m- or p-phenylene or other arylene group, such as naphthylene or anthracenylene, with or without a substituent thereon;
in formula IV, X and Y are each the same as X and Y of formula II, or X and Y may form a carbonyl group together with the carbon atom connected with X and Y, and Z is alkylene, arylene, aralkylene, alkenylene or aralkenylene group;
in formula V, m is an integer of 2 to 12 and the carbon ring composed of carbon atoms and —($CH_2$)$_m$— may contain an unsaturated bond and have a substitutent thereon;
in formulae VI and VIII, Z is the same as Z in formula IV, R in formula VIII being nitrogen atom or methine group;
in formula VII, X is the same as X in formula II;
said organic groups, $X_1$, $X_2$ in formula I, X, Y in formulae II and IV, and X in formula VII having carbon atoms of less than 30; and
said organic groups, Ar in formula III and Z in formulae IV, VI and VIII, having carbon atoms of less than 40, 8-substituted quinoline compound having the formula

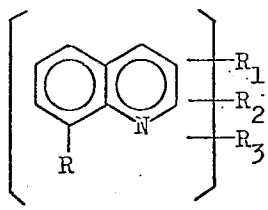

wherein R is an alkyl, aryl, amino, alkenyl, acyl, amide or hydroxyl group, said organic group having carbon atoms of less than 30, and $R_1$, $R_2$ and $R_3$ are an alkyl, amino, alkoxyl, carboxyl group or hydrogen, those being substituted at positions other than the 8-position of quinoline ring, and curing agent, the total mount of the ferrocene compound and the 8-substituted quinoline compound being 0.01 to 20 parts by weight per 100 parts by weight of the polyolefin, the ratio of the 8-substituted quinoline compound to the ferrocene compounds being 0.05 to 20 parts by weight of the 8-substituted quinoline compound per one part by weight of the ferrocene compound, and the amount of the curing agent being 0.5 to 10 parts by weight per 100 parts by weight of the polyolefin.

3. A cured composition prepared by curing a composition of claim 2.

4. A polyolefin composition for electrical insulation comprising polyolefin, a ferrocene compound which is at least one member selected from the group consisting of ferrocene and ferrocene compounds represented by the following formulae I to VIII:

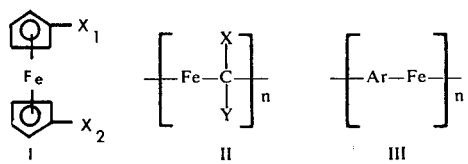

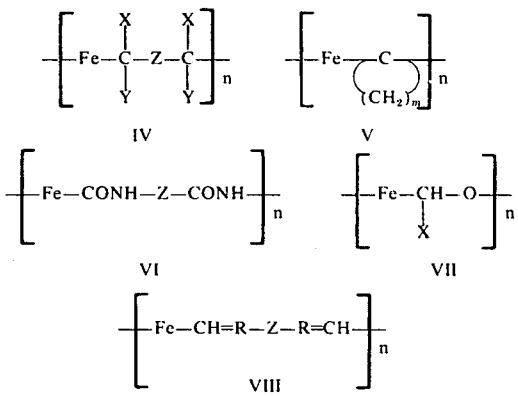

wherein, in formula I, $X_1$ and $X_2$ are each hydrogen or halogen atom, or alkyl, aryl, acyl, amino, carboxyl, carboalkoxyl or silyl group, respectively;
in formulae II to VIII, Fe is ferrocene ($X-C_5H_5$-Fe-$C_5H_5$) skeleton, —Fe— is a 1,2-, 1,3-, or 1,1'-disubstituted ferrocenylene unit and n is an integer of 2 to 10,000;
in formula II, X and Y are halogen or hydrogen atom, or alkyl, alkenyl, aryl, aralkyl, aralkenyl, hydroxyl or alkoxyl group, respectively;
in formula III, Ar is o-, m- or p-phenylene or other arylene group, such as naphthylene or anthracenylene, with or without a substitutent thereon;
in formula IV, X and Y are each the same as X and Y of formula II, or X and Y may form a carbonyl group together with the carbon atom connected with X and Y, and Z is alkylene, arylene, aralkylene, alkenylene or aralkenylene group;
in formula V, m is an integer of 2 to 12 and the carbon ring composed of carbon atoms and —($CH_2$)$_m$— may contain an unsaturated bond and have a substituent thereon;
in formulae VI and VIII, Z is the same as Z in formula IV, R in formula VIII being nitrogen atom or methine group;

in formula VII, X is the same as X in formula II;
said organic groups, $X_1$, $X_2$ in formula I, X, Y in formulae II and IV, and X in formula VII having carbon atoms of less than 30; and
said organic groups, Ar in formula III and Z in formulae IV, VI and VIII, having carbon atoms of less than 40, 8-substituted quinoline compound having the formula

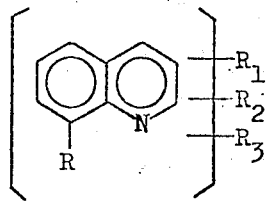

where R is an alkyl, aryl, amino, alkenyl, acyl, amide or hydroxyl group, said organic group having carbon atoms of less than 30, and $R_1$, $R_2$ and $R_3$ are an alkyl, amino, alkoxyl, carboxyl group or hydrogen, those being substituted at positions other than the 8-position of quinoline ring and siloxane oligomer,
said siloxane oligomers having one of following formulae X to XII:

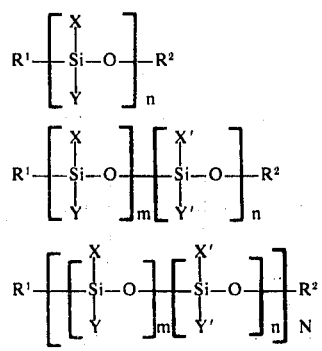

wherein, in formulae X to XII, $R^1$ is alkyl, aryl, alkoxyl, hydroxyl, aralkyl or alkenyl group, or halogen atom, $R^2$ is hydrogen atom, alkyl, aryl, aralkyl, alkenyl, or alkylhalosilyl group and X, Y, X' and Y' are each alkyl, alkenyl, aryl, aralkyl, aralkenyl, hydroxyl or alkoxyl group, or halogen atom, each group $R^1$, $R^2$, X, Y, X' and Y', having carbon atoms less than 15,
in formula X, n is an integer of 2 to 100, while in formula XI, m and n are each an integer of 1 to 60, said siloxane oligomers represented by formulae X and XI having a molecular weight of about 350 to about 30,000, in formula XII, N is 2 to 50,
in formula XI, X, X', Y, and Y' may be different from each other except that X is identical to X', and Y to Y', and also except that X, X', Y, and Y' are all identical the total amount of the ferrocene compound, the 8-substituted quinoline compound and the siloxane oligomer being 0.01 to 20 parts by weight per 100 parts by weight of the polyolefin, the ratio of the 8-substituted quinoline compound and the siloxane oligomer to the ferrocene compound being 0.05 to 20 parts by weight of the 8-substituted quinoline compound and 0.05 to 20 parts by weight of the siloxane oligomer per one part by weight of the ferrocene compound.

5. A polyolefin composition for electrical insulation of claim 4, wherein said 8-substituted quinoline compound is one selected from the group consisting of 8-phenylquinoline, 2,8-dimethylquinoline, 8-aminoquinoline, 8-hydroxyquinoline, 5-hydroxymethyl-8-hydroxyquinoline, quinoline-8-carboxylic acid, 2,8-dihydroxy quinoline, 8-hydroxycinchonic acid, and quinoline-8-carboxyaldehyde.

6. The polyolefin composition for electrical insulation of claim 4, wherein said siloxane oligomer is one represented by the following formula:

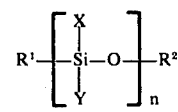

wherein n is an integer of 2 to 100, $R^1$ is alkyl, aryl, alkoxyl, hydroxyl, aralkyl, or alkenyl group, or halogen atom, $R^2$ is hydrogen atom, alkyl, aralkyl, alkenyl, or alkylhalosilyl group, and X and Y are each alkyl, alkenyl, aryl, aralkyl, aralkenyl, hydroxyl, alkoxyl group or halogen atoms, said organic groups, $R^1$, $R^2$, X, Y, having carbon atoms of less than 15.

7. The polyolefin composition for electrical insulation of claim 4, wherein said polyolefin is one selected from the group consisting of polyethylene, polypropylene, ethylene-propylene copolymer, ethylenepropylene-diene terpolymer, ethylene-vinyl acetate copolymer and a mixture thereof.

8. A polyolefin composition for electrical insulation comprising polyolefin, ferrocene compound which is at least one member selected from the group consisting of ferrocene and ferrocene compounds represented by the following formulas I to VIII:

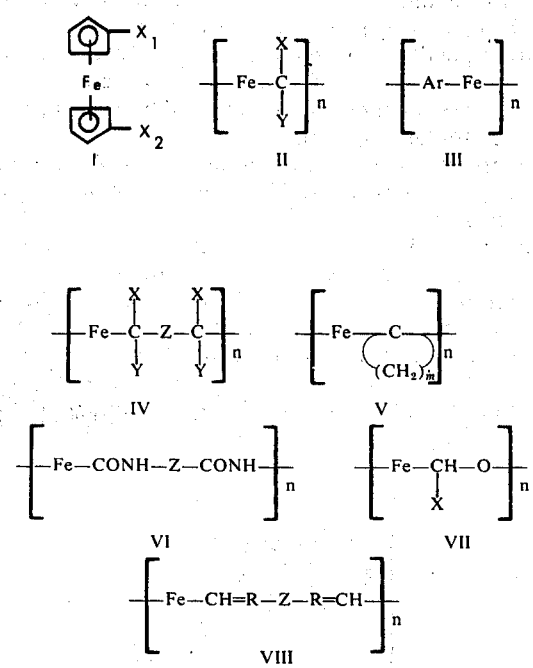

wherein, the formula I, $X_1$ and $X_2$ are each hydrogen or halogen atom, or alkyl, aryl, acyl, amino, carboxyl, carboalkoxyl or silyl group, respectively;
in formulae II to VIII, Fe is ferrocene (X-$C_5H_5$-Fe-$C_5H_5$) skeleton, —Fe— is a 1,2-, 1,3-, or 1,1'-disubstituted ferrocenylene unit and n is an integer of 2 to 10,000;

in formula II, X and Y are halogen or hydrogen atom, or alkyl, alkenyl, aryl, aralkyl, aralkenyl, hydroxyl or alkoxyl group, respectively;

in formula III, Ar is o-, m- or p-phenylene or other arylene group, such as naphthylene or anthracenylene, with or without a substituent thereon;

in formula IV, X and Y are each the same as X and Y of formula II, or X and Y may form a carbonyl group together with the carbon atom connected with X and Y, and Z is alkylene, arylene, aralkylene, alkenylene or aralkenylene group;

in formula V, m is an integer of 2 to 12 and the carbon ring composed of carbon atoms and —($CH_2$)$_m$— may contain an unsaturated bond and have a substituent thereon;

in formulae VI and VIII, Z is the same as Z in formula IV, R in formula VIII being nitrogen atom or methine group;

in formula VII, X is the same as X in formula II:

said organic groups, $X_1$, $X_2$ in formula I, X, Y in formulae II and IV, and X in formula VII having carbon atoms of less than 30; and said organic groups, Ar in formula III and Z in formulae IV, VI and VIII, having carbon atoms of less than 40, 8-substituted quinoline compound having the formula

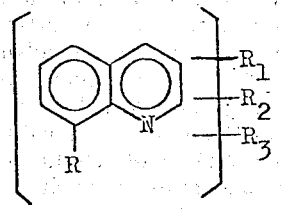

wherein R is an alkyl, aryl, amino, alkenyl, acyl, amide or hydroxyl group, said organic group having carbon atoms of less than 30, and $R_1$, $R_2$ and $R_3$ are an alkyl, amino, alkoxyl, carboxyl group or hydrogen, those being substituted at positions other than the 8-position of quinoline ring, siloxane oligomer said siloxane oligomers having one of following formulae X to XII:

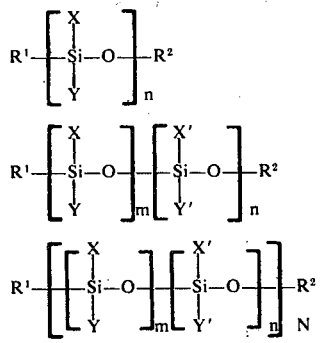

wherein, in formulae X to XII, $R^1$ is alkyl, aryl, alkoxyl, hydroxyl, aralkyl or alkenyl group, or halogen atom, $R^2$ is hydrogen atom, alkyl, aryl, aralkyl, alkenyl, or alkylhalosilyl group and X, Y, X' and Y' are each alkyl, alkenyl, aryl, aralkyl, aralkenyl, hydroxyl or alkoxyl group, or halogen atom, each group $R^1$, $R^2$, X, Y, X' and Y', having carbon atoms less than 15, in formula X, n is an integer of 2 to 100, while in formula XI, m and n are each an integer of 1 to 60, said siloxane oligomers represented by formulae X and XI having a molecular weight of about 350 to about 30,000, in formula XII, N is 2 to 50, in formula XI, X, X', Y, and Y' may be different from each other except that X is identical to X', and Y to Y', and also except that X, X', Y, and Y' are all identical and curing agent, the total amount of the ferrocene compound, the 8-substituted quinoline compound and the siloxane oligomer being 0.01 to 20 parts by weight per 100 parts by weight of polyolefin, the ratio of the 8-substituted quinoline compound and the siloxane oligomer to the ferrocene compound being 0.05 to 20 parts by weight of the 8-substituted quinoline compound and 0.05 to 20 parts by weight of the siloxane oligomer per one part by weight of the ferrocene compound, the amount of the curing agent being 0.5 to 10 parts by weight per 100 parts by weight of the polyolefin.

9. The cured composition prepared by curing a composition of claim 8.

10. A polyolefin composition for electrical insulation comprising polyolefin, ferrocene, a ferrocene compound which is at least one member selected from the group consisting of ferrocene and ferrocene compounds represented by the following formulae I to VIII:

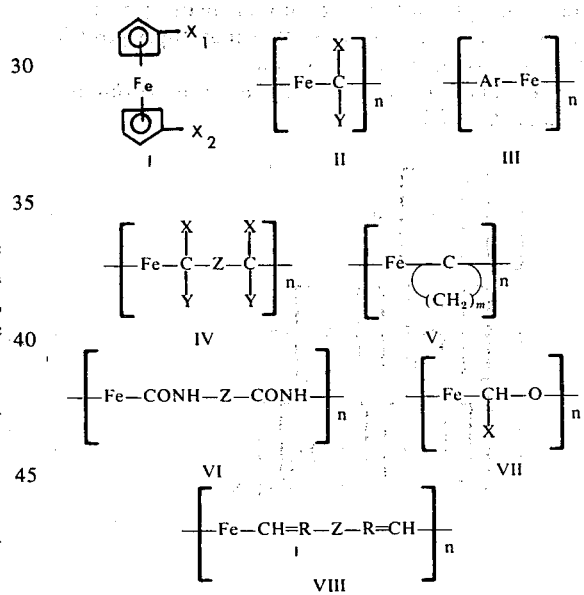

wherein, in formula I, $X_1$ and $X_2$ are each hydrogen or halogen atom, or alkyl, aryl, acyl, amino, carboxyl, carboalkoxyl or silyl group, respectively;

in formulae II to VIII, Fe is ferrocene (X-$C_5H_5$-Fe-$C_5H_5$) skeleton, —Fe— is a 1,2-, 1,3-, or 1,1'-disubstituted ferrocenylene unit and n is an integer of 2 to 10,000;

in formula II, X and Y are halogen or hydrogen atom, or alkyl, alkenyl, aryl, aralkyl, aralkenyl, hydroxyl or alkoxyl group, respectively;

in formula III, Ar is o-, m- or p-phenylene or other arylene group, such as naphthylene or anthracenylene, with or without a substituent thereon;

in formula IV, X and Y are each the same as X and Y of formula II, or X and Y may form a carbonyl group together with the carbon atom connected with X and Y, and Z is alkylene, arylene, aralkylene, alkenylene or aralkenylene group;

in formula V, m is an integer of 2 to 12 and the carbon ring composed of carbon atoms and —(CH$_2$)$_m$— may contain an unsaturated bond and have a substituent thereon;

in formulae VI and VIII, Z is the same as Z in formula IV, R in formula VIII being nitrogen atom or methine group;

in formula VII, X is the same as X in formula II;

said organic groups, X$_1$, X$_2$ in formula I, X, Y in formulae II and IV, and X in formula VII having carbon atoms of less than 30; and said organic groups, Ar in formula III and Z in formulae IV, VI and VIII, having carbon atoms of less than 40, 8-substituted quinoline compound having the formula

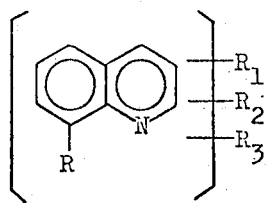

wherein R is an alkyl, aryl, amino, alkenyl, acyl, amide or hydroxyl group, said organic group having carbon atoms of less than 30, and R$_1$, R$_2$ and R$_3$ are an alkyl, amino, alkoxyl, carboxyl group or hydrogen, those being substituted at positions other than the 8-position of quinoline ring, siloxane oligomer, said siloxane oligomers having one of following formulae X to XII:

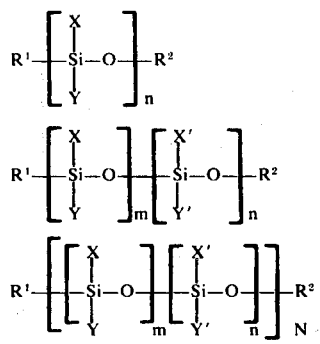

wherein, in formulae X to XII, R$^1$ is alkyl, aryl, alkoxyl, hydroxyl, aralkyl or alkenyl group, or halogen atom, R$^2$ is hydrogen atom, alkyl, aryl, aralkyl, alkenyl, or alkylhalosilyl group and X, Y, X' and Y' are each alkyl, alkenyl, aryl, aralkyl, aralkenyl, hydroxyl or alkoxyl group, or halogen atom, each group R$^1$, R$^2$, X, Y, X' and Y', having carbon atoms less than 15, in formula X, n is an integer of 2 to 100, while in formula XI, m and n are each an integer of 1 to 60, said siloxane oligomers represented by formulae X and XI having a molecular weight of about 350 to about 30,000, in formula XII, N is 2 to 50, in formula XI, X, X', Y, and Y' may be different from each other except that X is identical to X', and Y to Y', and also except that X, X', Y, and Y' are all identical curing atent and unsaturated polymer, the total mount of the ferrocene compound, the 8-substituted quinoline compound and siloxane oligomer being 0.01 to 20 parts by weight per 100 parts by weight of polyolefin, the ratio of the 8-substituted quinoline compound and the siloxane oligomer to the ferrocene compound being 0.05 to 20 parts by weight of the 8-substituted quinoline compound and 0.05 to 20 parts by weight of the siloxane oligomer per one part by weight of the ferrocene compound, the amount of the curing agent being 0.5 to 10 parts by weight of per 100 parts by weight of the polyolefin, said unsaturated polymer being one containing at least 0.5 unsaturated bond or unsaturated atomic group selected from the group consisting of C=C, aromatic ring and C≡N per unit structure constituting the unsaturated polymer, the amount of said unsaturated polymer being 0.05 to 10 parts by weight per one part by weight of the total amount of the ferrocene compound, the 8-substituted quinoline compound and the siloxane oligomer.

11. The polyolefin composition for electrical insulation of claim 10, wherein said unsaturated polymer is one selected from the group consisting of 1,2-polybutadiene, styrene-butadiene copolymer, 1,4-polybutadiene, nitrile-butadiene copolymer, and a mixture thereof.

* * * * *